(12) United States Patent
Malinin et al.

(10) Patent No.: US 8,750,006 B2
(45) Date of Patent: Jun. 10, 2014

(54) SYNCHRONOUS RECTIFIER CIRCUIT

(75) Inventors: Andrey Malinin, Fort Collins, CO (US); Anatoly Cherepakhin, Fort Collins, CO (US); Eric Allan Larson, Johnstown, CO (US)

(73) Assignee: Integrated Device Technology inc., San Jose, CA (US)

( * ) Notice: Subject to any disclaimer, the term of this patent is extended or adjusted under 35 U.S.C. 154(b) by 757 days.

(21) Appl. No.: 12/649,301

(22) Filed: Dec. 29, 2009

(65) Prior Publication Data

US 2011/0157945 A1 Jun. 30, 2011

(51) Int. Cl.
*H02M 7/217* (2006.01)
(52) U.S. Cl.
USPC ........................................................ 363/127
(58) Field of Classification Search
USPC ........................................................ 363/127
See application file for complete search history.

(56) References Cited

U.S. PATENT DOCUMENTS

| | | | |
|---|---|---|---|
| 4,016,452 A * | 4/1977 | Willis | ............................ 323/305 |
| 4,821,163 A | 4/1989 | Bloom | |
| 5,731,731 A | 3/1998 | Wilcox et al. | |
| 5,912,552 A | 6/1999 | Tateishi | |
| 5,940,287 A | 8/1999 | Brkovic | |
| 6,134,131 A * | 10/2000 | Poon et al. | ..................... 363/127 |
| 7,791,903 B2 * | 9/2010 | Zhang et al. | ................... 363/127 |
| 2001/0033506 A1 * | 10/2001 | Farrington et al. | ........... 363/127 |

FOREIGN PATENT DOCUMENTS

RU 2017277 C1 * 7/1994

OTHER PUBLICATIONS

PCT International Search Report and Written Opinion of the International Searching Authority for PCT/US2010/061837, dated Feb. 8, 2013, 8 pages.

* cited by examiner

*Primary Examiner* — Jue Zhang
(74) *Attorney, Agent, or Firm* — TraskBritt, P.C

(57) ABSTRACT

A synchronous rectifier circuit rectifies an AC input voltage to produce a DC output voltage. The synchronous rectifier circuit comprises MOSFET (metal-oxide-semiconductor field-effect transistor) switches coupled within secondary transformer windings resulting in a shortened AC current path compared to conventional synchronous rectifier circuits. The shortened current path mitigates skin and proximity effects, substantially improving the power efficiency of the synchronous rectifier circuit. A rectifier assembly integrates one or more synchronous rectifier circuits within a magnetic core.

15 Claims, 8 Drawing Sheets

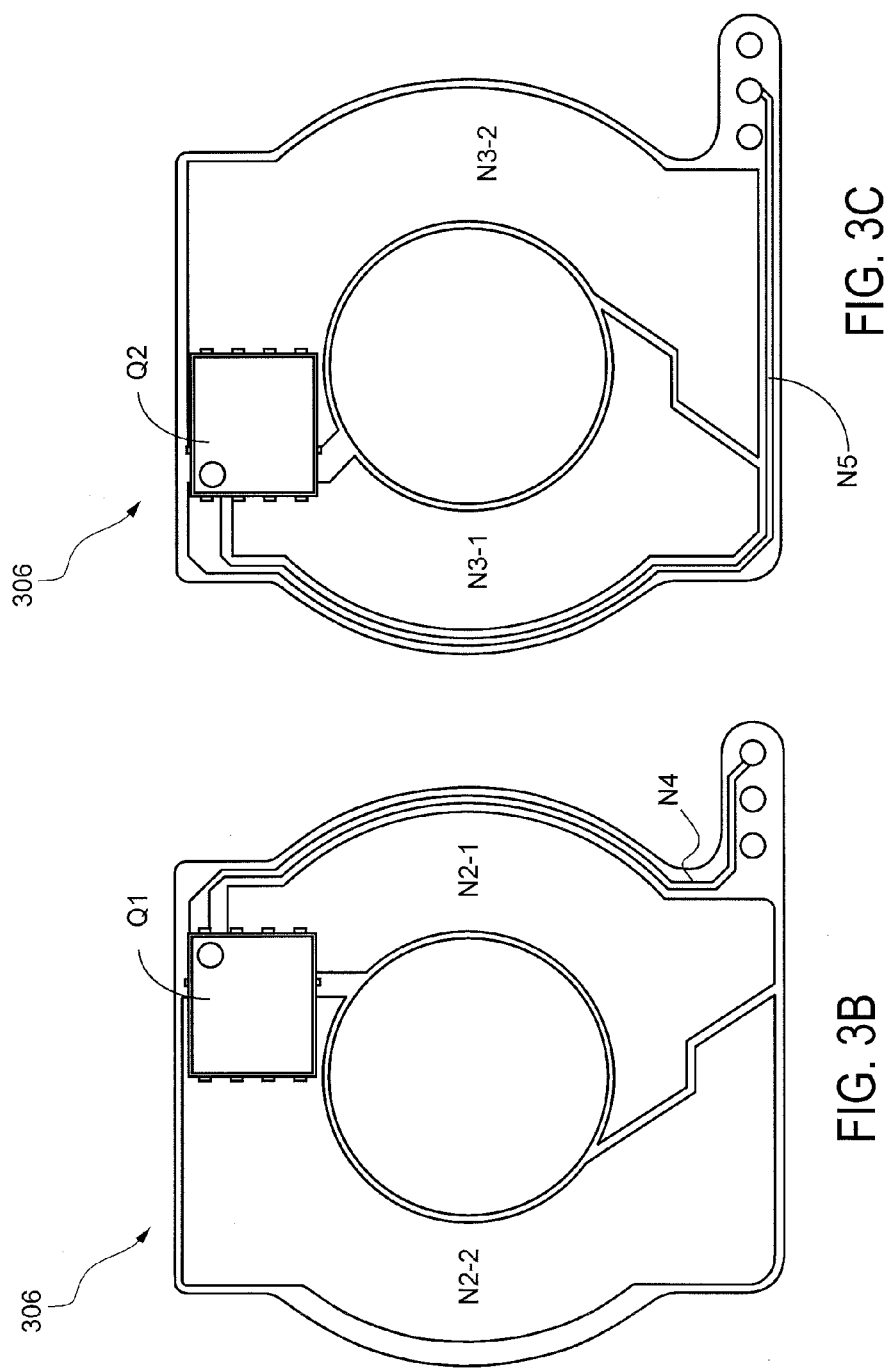

SYNCHRONOUS RECTIFIER CIRCUIT

BACKGROUND OF THE INVENTION

1. Field of the Invention

The present invention relates to power conversion, and more specifically, to a synchronous rectifier circuit.

2. Description of the Related Art

Power converters are used in a wide variety of electrical equipment. A rectification circuit is a common component of a power converter that converts alternating current (AC) to direct current (DC). Recently, many power supply designers have adopted synchronous rectification systems, characterized in that they use MOSFETs (metal-oxide-semiconductor field-effect transistors) to achieve the rectification function conventionally performed by diodes. Synchronous rectifier circuits provide improved power efficiency and reliability over conventional rectifier circuits, and can also decrease overall system cost.

FIG. 1 is a circuit diagram illustrating a conventional synchronous rectifier circuit 100. The synchronous rectifier circuit 100 comprises input capacitor C1, transformer 118, switches Q1 and Q2 (e.g., N-type MOSFET switches), and gate drivers 114, 116. Transformer 118 includes magnetic core 120, primary winding N1, and secondary windings N2, N3. Input capacitor C1 operates as an input filter to block the DC component of input voltage Vin and pass the AC component of voltage $Vin_{AC}$ to transformer 118. The AC input voltage $Vin_{AC}$ across primary winding N1 of transformer 118 induces a voltage across secondary windings N2, N3. When $Vin_{AC}$ is positive, Vctrl1 turns on switch Q1 via gate driver 114 and Vctrl2 turns off switch Q2 via gate driver 116. Current $i_1$ is induced in secondary winding N2 and flows from the start of secondary winding N2 to the output terminal 119 producing a positive output voltage $V_{out}$. When $Vin_{AC}$ becomes negative, Vctrl1 turns off switch Q1 via gate driver 114 and Vctrl2 turns on switch Q2 via gate driver 116. Current $i_2$ flows from the end of secondary winding N3 to the output terminal 118 producing a positive output voltage $V_{out}$. Thus, output voltage Vout always has a positive polarity even though the input voltage Vin alternates between positive and negative polarities.

A problem with the conventional synchronous rectifier circuit 100 is that its efficiency decreases as the frequency of AC input signal $Vin_{AC}$ rises due to skin effects and proximity effects. Skin effects cause the AC current to distribute itself near the outer layer of the conducting components. This increases the effective resistance of the conductors, which in turn, increases power loss of the conventional synchronous rectifier circuit 100. Proximity effects further increase the effective resistance of conductors within closely wound coils (such as windings N1, N2, N3) by constraining the currents to smaller regions of the conductor. Both skin effects and proximity effects increase with frequency, and at high frequencies, the power loss can become substantial.

SUMMARY OF THE INVENTION

A synchronous rectifier circuit rectifies an AC input voltage to produce a DC output voltage. The synchronous rectifier circuit comprises a transformer configured to receive an input voltage across a primary winding and induce voltages across a first secondary winding and a second secondary winding. In one embodiment, a first switch is coupled in series between a first portion of the first secondary winding and a second portion of the first secondary winding. A second switch is coupled in series between a first portion of the second secondary winding and a second portion of the second secondary winding. A first output terminal is coupled to a tap between the first portions of the secondary windings. A second output terminal having a polarity opposite the first output terminal is coupled to a tap between the second portions of the secondary windings.

In operation, a first control signal (e.g., a gate driver signal) turns the first switch on when the input voltage has a positive polarity and turns the first switch off when the input voltage has a negative polarity. This causes a positive current to flow through the first switch to the second output terminal. Similarly, a second control signal turns the second switch on when the input voltage has a negative polarity and turns the second switch off when the input voltage has a positive polarity, causing a positive current to flow through the second switch to the second output terminal. Thus, the output voltage of the synchronous rectifier circuit always has a positive polarity even though the AC input voltage alternates between positive and negative polarities.

Advantageously, the synchronous rectifier circuit integrates the first and second switches within the secondary transformer windings (i.e., the first switch between the first and second portions of the first secondary winding, and the second switch between the first and second portions of the second secondary winding). This beneficially results in a shortened AC current path compared to the conventional synchronous rectifier circuit. The shortened current path mitigates skin effects and proximity effects, substantially improving the power efficiency of the synchronous rectifier circuit.

In another embodiment, an apparatus incorporates one or more electrical components into a magnetic device. For example, in one embodiment, the apparatus comprises a magnetic core, a primary transformer winding wrapped around the magnetic core, and secondary transformer windings wrapped around the magnetic core. One or more electrical components (e.g., semiconductor-based switches) are coupled in series between first portions of the secondary transformer windings and second portions of the secondary transformer windings.

In another embodiment, a rectifier assembly integrates one or more synchronous rectifier circuits within a magnetic core. The rectifier assembly for a synchronous rectifier circuit comprises a lower component, an upper component and a middle component. The lower component comprises a first portion of a primary transformer winding wrapped around a magnetic core. The upper component comprises a second portion of the primary transformer winding wrapped around the magnetic core. The middle component comprises a first switch coupled in series between a first portion of a first secondary transformer winding and a second portion of the first secondary transformer winding, and a second switch coupled in series between a first portion of the second secondary transformer winding and a second portion of the second secondary transformer winding. In one embodiment, the magnetic core is structured to substantially enclose the lower component, upper component, and middle component of the rectifier assembly.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

FIG. 3B is an internal view of a first layer of the rectifier assembly in accordance with an embodiment of the present invention.

FIG. 3C is an internal view of a second layer of the rectifier assembly in accordance with an embodiment of the present invention.

DETAILED DESCRIPTION OF EMBODIMENTS

The Figures (FIG.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1:
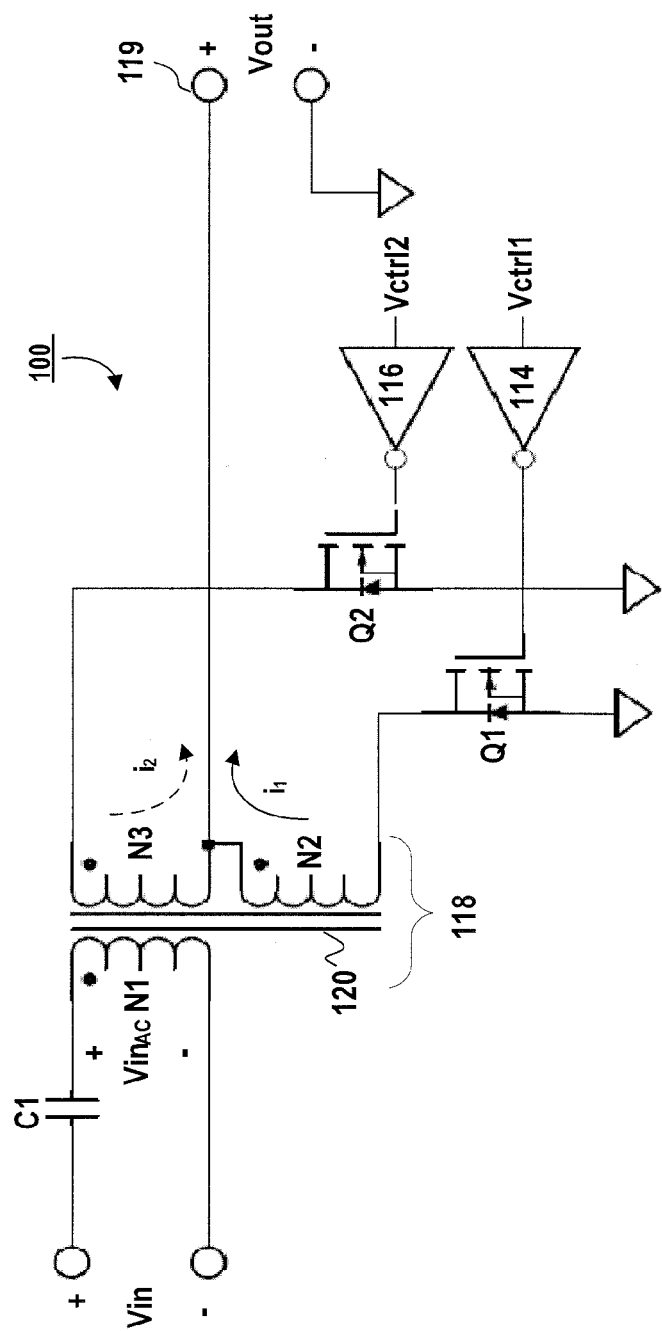
FIG. 1 is a circuit diagram illustrating a conventional synchronous rectifier circuit.
Figure 2:
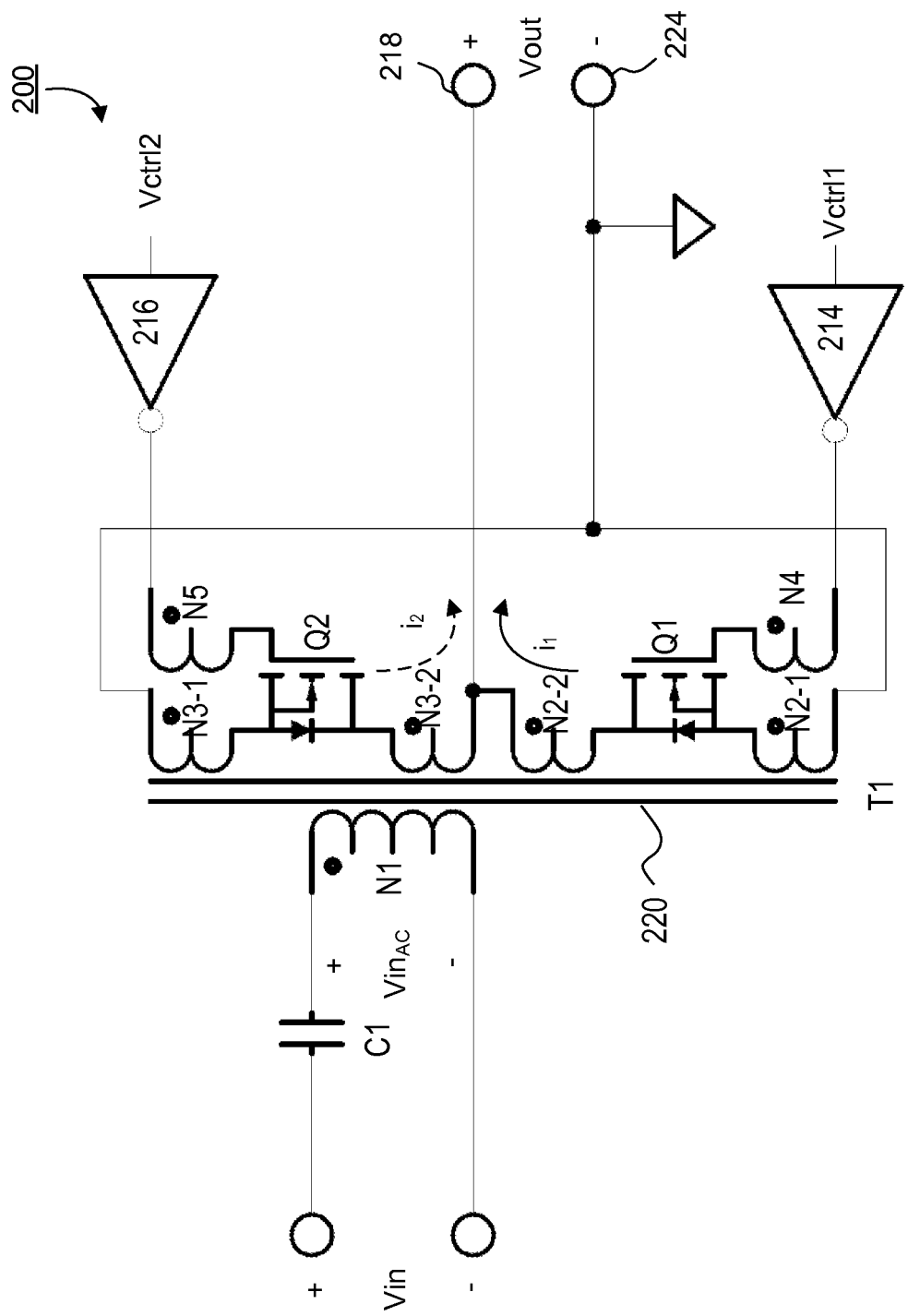
FIG. 2 is a circuit diagram illustrating a synchronous rectifier circuit in accordance with an embodiment of the present invention.

FIG. 2 is a circuit diagram illustrating a synchronous rectifier circuit 200 in accordance with an embodiment of the present invention. As will be explained in more detail below, synchronous rectifier circuit 200 rectifies AC input voltage Vin using switches Q1, Q2 that are integrated into secondary transformer windings N2, N3. This results in a shortened AC current path that counters the skin effects and proximity effects and provides improved power efficiency over the conventional synchronous rectifier circuit 100.

The synchronous rectifier circuit 200 comprises input capacitor C1, transformer T1, switches Q1 and Q2 (e.g., N-type MOSFET switches), and drivers 214, 216. Transformer T1 includes a magnetic core 220, a primary winding N1, first secondary winding N2 having a first portion N2-1 and a second portion N2-2 (collectively referenced as N2 herein), and second secondary winding N3 having a first portion N3-1 and a second portion N3-2 (collectively referenced as N3 herein). A first output terminal 224 is coupled to the first portions of secondary windings N2-1 and N3-1. A second output terminal 218 having a polarity opposite the first output terminal 224 is coupled to the second portions of the secondary windings N2-2 and N3-2. A differential output voltage is produced between the first output terminal 224 and the second output terminal 218. In the illustrated embodiment described herein, the second output terminal 218 is a positive output terminal and the first output terminal 224 is a negative output terminal. However, it will be apparent to those of ordinary skill in the art that in alternative embodiments, the polarities of output terminals 218, 224 can be switched.

Switch Q1 is coupled in series between the first portion N2-1 and the second portion N2-2 of secondary winding N2. Although the figure illustrates the portions N2-1 and N2-2 as having the same length (i.e., same number of turns), in alternative embodiments, secondary winding N2 can be asymmetrically divided such that portions N2-1 and N2-2 have different lengths or different numbers of turns. Similarly, switch Q2 is coupled in series between the first portion N3-1 and the second portion N3-2 of secondary winding N3. Secondary winding N3 can be divided either symmetrically such that portions N3-1 and N3-2 have the same number of turns, or asymmetrically such that portions N3-1 and N3-2 have different numbers of turns. Windings N2 and N3 have the same number of turns such that voltages induced across each winding N2, N3 are substantially the same. In one embodiment, windings N2 and N3 each comprise only a single turn or a partial turn. Thus, as used herein, the "number of turns" of the winding portions N2-1, N2-2, N3-1 and N3-2 may comprise a fractional value.

The second portions N2-2, N3-2 of the secondary windings N2 and N3 are coupled together at their respective ends opposite the switches Q1, Q2, and the output terminal 218 (the positive terminal, as illustrated) is coupled to the coupling point between second portions N2-2 and N3-2. The first portions N2-1, N2-2 of the secondary windings N2 and N3 are coupled together at their respective ends opposite the switches Q1, Q2 and the output terminal 224 (the negative terminal, as illustrated) is coupled to the coupling point between first portions N2-1 and N3-1.

In one aspect, the synchronous rectifier circuit 200 differs from the conventional synchronous rectifier circuit 100 in that the sources of switches Q1 and Q2 are not coupled directly to ground. Thus, the source voltages will vary with $Vin_{AC}$ due to the voltages induced across winding portions N2-1 and N3-1. To compensate for the varying source voltages, a voltage compensation winding N4 is coupled in series between the output of driver 214 and the control terminal (e.g., a gate) of switch Q1, and a voltage compensation winding N5 is coupled in series between the output of driver 216 and the control terminal (e.g., a gate) of switch Q2. In one embodiment, the voltage compensation winding N4 has a substantially same electromagnetic path length (e.g., a same number of turns or partial turn length) as winding portion N2-1 such that the voltage induced across the voltage compensation winding N4 is approximately equal to the voltage induced across winding portion N2-1. Similarly, the voltage compensation winding N5 has a substantially same electromagnetic path length (e.g., a same number of turns or partial turn length) as winding portion N3-1 such that the voltage induced across the voltage compensation winding N5 is approximately equal to the voltage induced across winding portion N3-1. Thus, the voltage compensation windings N4 and N5 cause the gate voltage of switches Q1, Q2 to vary with the input voltage $Vin_{AC}$ similarly to the source voltage of switches Q1, Q2. This maintains substantially constant gate-source voltages of switches Q1 and Q2 and ensures proper switching.

In operation, capacitor C1 operates as an input filter to block the DC component of input voltage Vin and pass the AC component $Vin_{AC}$ to transformer Ti. The voltage $Vin_{AC}$ across primary winding N1 induces a voltage across secondary windings N2, N3. When $Vin_{AC}$ is positive, Vctrl1 turns on switch Q1 via gate driver 214 and Vctrl2 turns off switch Q2 via gate driver 216. Transformer Ti induces current $i_1$ in secondary winding N2. Current $i_1$ flows from the start of secondary winding N2 to the output terminal 218, producing a positive output voltage $V_{out}$. Output voltage Vout is given by:

$$Vout = \frac{n2}{n1} Vin_{AC} \quad (1)$$
$$Vin_{AC} \geq 0$$

where n2 is the total number of turns in secondary winding N2 and n1 is the number of turns in primary winding Ni.

When $Vin_{AC}$ becomes negative, Vctrl1 turns off switch Q1 via gate driver 214 and Vctrl2 turns on switch Q2 via gate driver 216. Transformer T1 induces current $i_2$ in secondary winding N3. Current $i_2$ flows from the end of secondary winding N3 to the output terminal 218, producing a positive output voltage Vout. Output voltage Vout is given by:

$$Vout = -\frac{n3}{n1} Vin_{AC} \quad (2)$$
$$Vin_{AC} \leq 0$$

where n3 is the total number of turns in secondary winding N3 and n1 is the number of turns in primary winding N1. Assuming, N2 and N3 have the same electromagnetic path (e.g., a same number of turns or partial turn length), Eq. (1) and (2) can be combined to yield:

$$Vout = \frac{n23}{n1} |Vin_{AC}| \quad (3)$$

where n23 is the number of turns in each of secondary windings N2 and N3. Thus, output voltage Vout always has a positive polarity even though AC input voltage $Vin_{AC}$ alternates between positive and negative polarities. Control signals Vctrl1 and Vctrl2 can be generated automatically by sensing the polarity of AC input signal $Vin_{AC}$.

Beneficially, the synchronous rectifier circuit 200 and rectifier assembly 300 of the present invention provides improved power efficiency compared to the conventional synchronous rectifier circuit 100. By locating switches Q1, Q2 inside of the secondary transformer windings N2, N3, the length of the current path outside of transformer T1 is substantially reduced compared to the conventional synchronous rectifier circuit 100. In the conventional synchronous rectifier circuit 100 with switches Q1, Q2, located outside the transformer 118, AC currents i1, i2 must pass through the external rectifier circuit 100 wiring coupling secondary windings N2, N3 to switches Q1, Q2, and additional external wiring coupling switches Q1, Q2 to the ground plane. In contrast, by incorporating switches Q1, Q2 inside the transformer winding, the synchronous rectifier circuit 200 of the present invention does not require any substantial external wiring in the AC current path. Rather, winding portions N3-1, N2-2 of transformer T1 can be coupled directly to the ground plane. As a result, power inefficiencies due to skin effects and proximity effects are mitigated.

In another embodiment, an apparatus incorporates one or more electrical components into a magnetic device. For example, in one embodiment, the apparatus comprises a magnetic core a primary transformer winding wrapped around the magnetic core, and at least one secondary transformer winding wrapped around the magnetic core. In one embodiment, the apparatus includes an even number of secondary transformer windings. One or more electrical components (e.g., semiconductor-based switches) are coupled in series within the secondary transformer winding. For example, in one embodiment, the one or more electrical components are coupled in series between a first portion of the secondary transformer winding and a second portion of the secondary transformer winding. In one embodiment, the electrical components comprise rectification components configured to rectify an AC voltage induced across the secondary transformer winding and produce a DC output voltage. Furthermore, in one embodiment, the electrical components are substantially enclosed within the magnetic device.

Figure 3A:
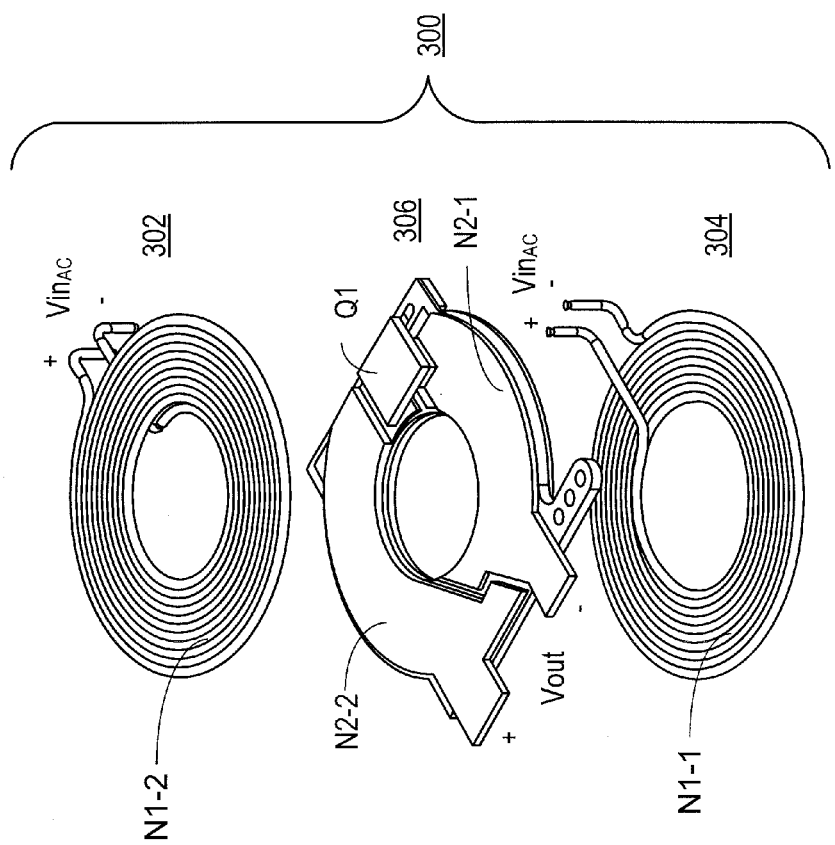
FIG. 3A is an exploded view of a rectifier assembly in accordance with an embodiment of the present invention.

FIGS. 3A-5 illustrate an example embodiment of an apparatus that incorporates electrical components into a magnetic device. FIG. 3A illustrates an exploded view of a rectifier assembly 300 for a synchronous rectifier circuit. The rectifier assembly 300 is electrically similar to the synchronous rectifier circuit 200 of FIG. 2, but includes two primary windings N1-1, N1-2 instead of the single primary winding N1. Rectifier assembly 300 comprises a lower component 304, a middle component 306, and an upper component 302. Lower component 304 comprises first primary winding N1-1 and the upper component 302 comprises second primary winding N1-2. Each primary winding N1-1, N1-2 is configured in a flattened spiral structured to wrap around a cylindrical magnetic core (not shown in FIG. 3A). In the illustrated embodiment, the primary windings N1-1, N1-2 are electrically coupled to each other in parallel via the input terminals $Vin_{AC}$. Alternatively, the primary windings N1-1, N1-2 can be electrically coupled in series. Including two primary windings N1-1, N1-2 has the benefit of making the transformer circuit symmetrical for positive and negative half-waves of the input voltage $Vin_{AC}$.

The middle component 306 comprises secondary windings N2, N3, switches Q1-Q2, and voltage compensation windings N4, N5. Windings N2-1, N2-2 are visible on the top side of middle assembly 306. Components N3, Q2, N4, N5 are not visible in FIG. 3A, but the configuration of such may be seen in FIGS. 3B and 3C, as discussed below. The components N2, N3, N4, N5, Q1, Q2 are electrically coupled identically to those of the synchronous rectifier circuit 200 in FIG. 2, as described above. Drivers 214, 216 can optionally be integrated into the rectifier assembly 300 or can be located externally to rectifier assembly 300.

FIGS. 3B and 3C illustrate internal views of different layers of the middle component 306. In the example embodiment, secondary windings N2, N3 each comprise one full turn, and the portions N2-1, N2-2, N3-1, N3-2 each comprise a partial turn. FIG. 3B illustrates a first layer showing the layout of the first secondary winding N2. Switch Q1 is coupled in series between portions N2-1 and N2-2. Voltage compensation winding N4 has a substantially equivalent electromagnetic path as the path of portion N2-1 (i.e., the partial turn length is approximately equal), and is coupled to a control terminal (e.g., a gate) of switch Q1. FIG. 3C illustrates a second layer showing the layout of the second secondary winding N3. Switch Q2 is coupled in series between portions N3-1 and N3-2. The voltage compensation winding N5 has a substantially equivalent electromagnetic path as portion N3-1, and is coupled to a control terminal of switch Q2. In one embodiment, the layer in FIG. 3B represents a top layer of the middle component 306 and the layer in FIG. 3C represents a bottom layer of the middle component 306. In one embodiment, switch Q2 and windings N3, N5 reside on the bottom side of the layer in FIG. 3C such that when assembled, all components face outward on the outer sides of the middle component 306 (not shown).

Figure 4:
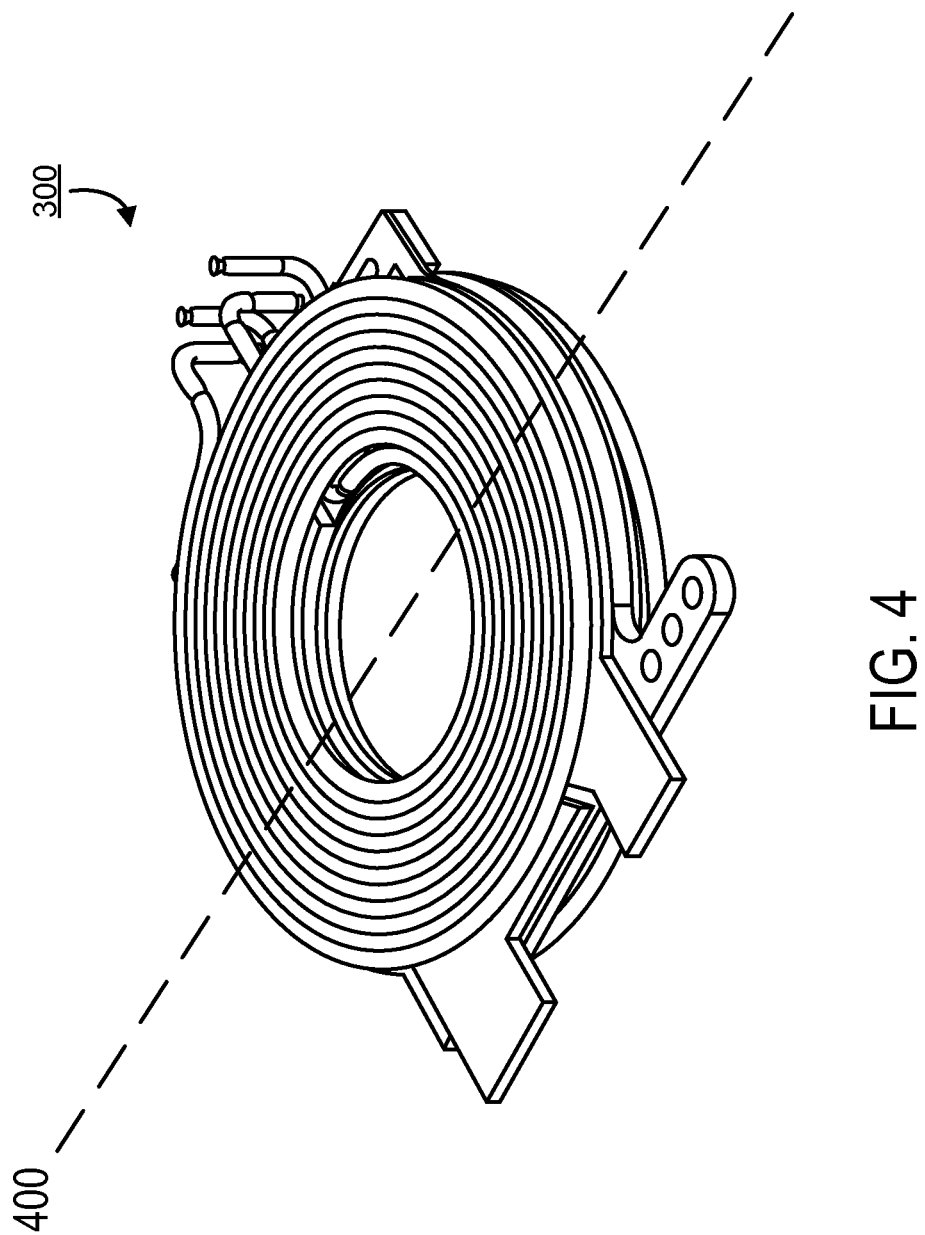
FIG. 4 is an assembled view of a rectifier assembly in accordance with an embodiment of the present invention.

FIG. 4 illustrates an assembled view of rectifier assembly 300. Here, the lower component 304, middle component 306, and upper component 302 are vertically stacked to form the assembly 300.

Figure 5:
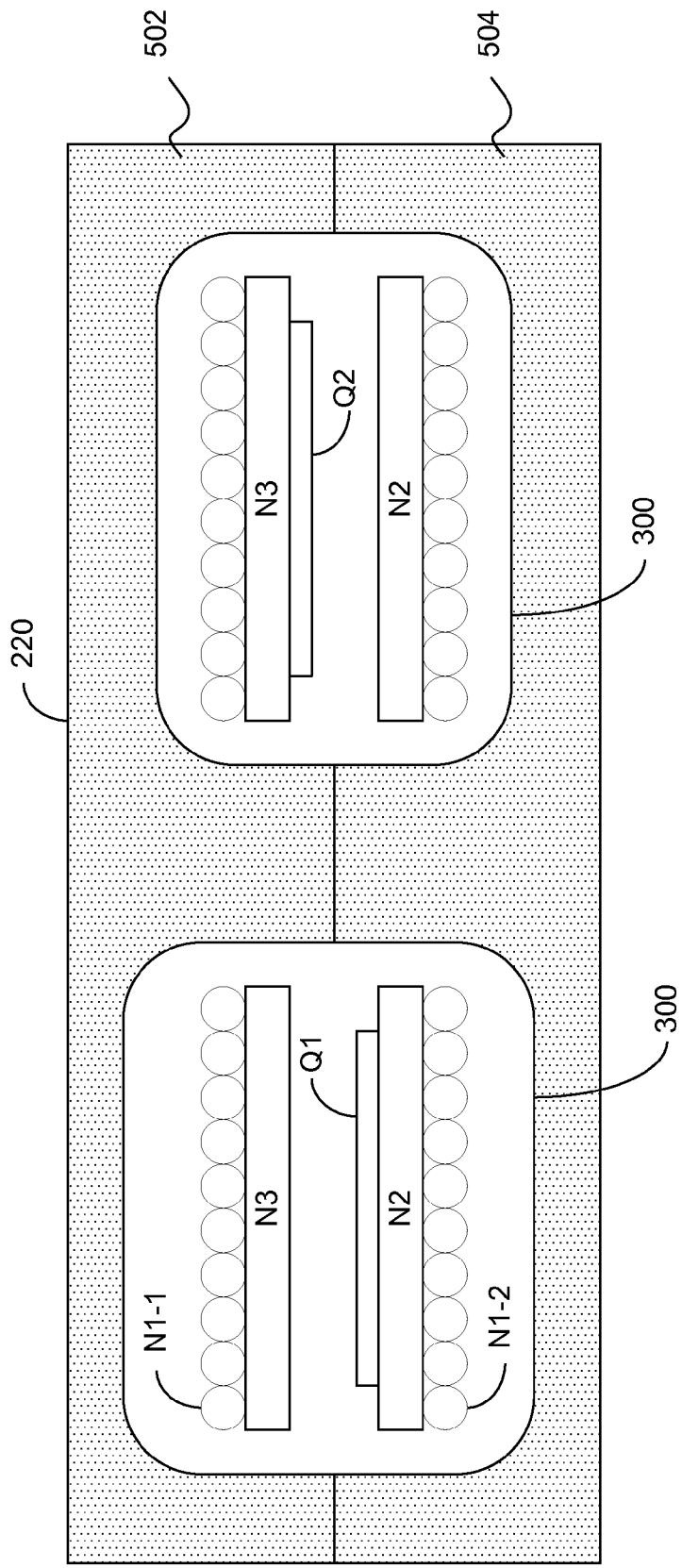
FIG. 5 is a cross-sectional view of a rectifier assembly in accordance with an embodiment of the present invention.

FIG. 5 illustrates a cross-sectional view of rectifier assembly 300 as taken along section line 400 of FIG. 4. The cross-sectional view illustrates rectifier assembly 300 within a magnetic core 220 (not shown in FIGS. 3A-4). In one embodiment, the magnetic core 220 comprises an upper portion 502 and a lower portion 504. Upper portion 502 and lower portion 504 can be separated from each other in order to allow the remaining components of rectifier assembly 300 to be inserted and locked within magnetic core 220. As can be seen, primary windings N1-1, N1-2, and secondary windings N2, N3 wrap around magnetic core 220. Furthermore, magnetic core 220 is structured to substantially enclose rectifier assembly 300.

In this example embodiment, primary windings N1-1, N1-2 each have approximately 10 turns. Secondary windings N2 and N3 each comprise only a single turn. Applying equation (3) above, this results in a gain of 0.1. Thus, for example, if the rectifier assembly 300 of the example embodiment receives a 50V AC input voltage, the rectifier assembly 300 will provide a 5V DC output voltage. Various embodiments can have different numbers of turns depending on the desired gain of the rectifier assembly 300.

The cross-sectional view of FIG. 5 shows switches Q1 and Q2 coupled to the secondary windings N2 and N3, respectively. Switches Q1 and Q2 are shown intersecting section line 400 of FIG. 4 for the purpose of illustration only. In various embodiments, switches Q1 and Q2 can be at any physical location along the secondary windings N2, N3 and may not intersect section line 400.

Figure 6:
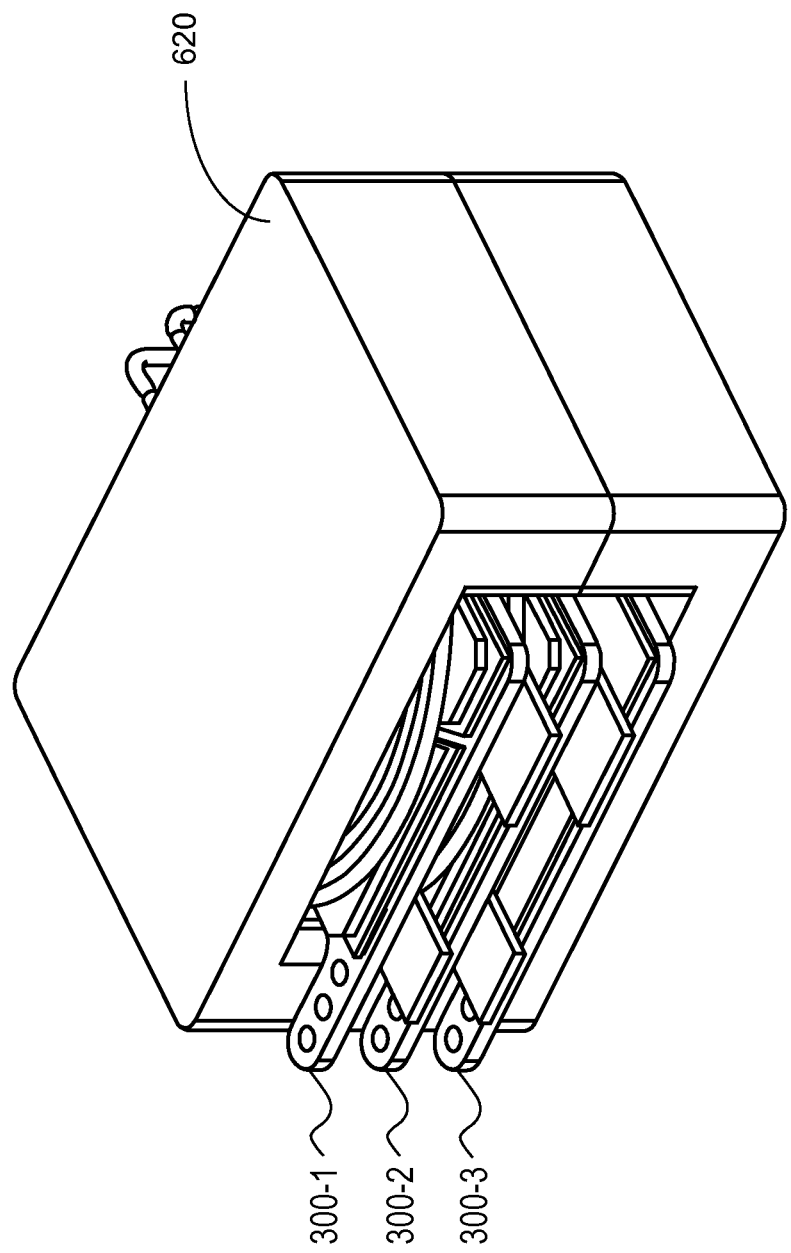
FIG. 6 is an assembled view of a stack of rectifier assemblies in accordance with an embodiment of the present invention.

In one embodiment, two or more rectifier assemblies 300 can share a single magnetic core 620. For example, as illustrated in FIG. 6, assemblies 300-1, 300-2, and 300-3 are stacked inside shared magnetic core 620. In various embodiments, any number of assemblies 300 can be stacked within a magnetic core 620. In this embodiment, the windings of each rectifier assembly 300 wrap around a cylindrical center of the magnetic core 620 (not seen in FIG. 6). Furthermore, the magnetic core 620 is structured to substantially enclose each of the rectifier assemblies 300.

Figure 7:
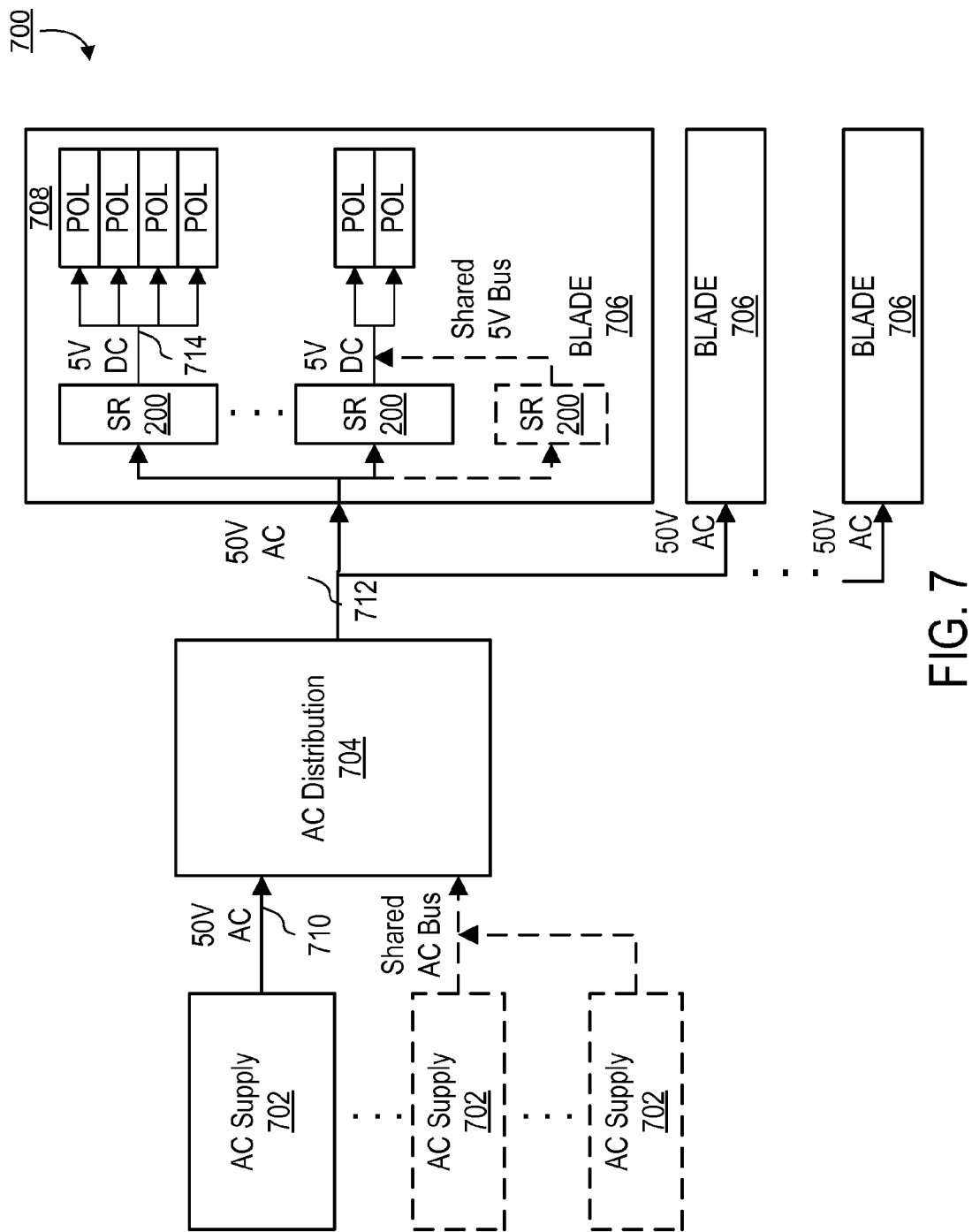
FIG. 7 is a system diagram illustrating an AC distribution system using a synchronous rectifier circuit in accordance with an embodiment of the present invention.

FIG. 7 illustrates an example application for synchronous rectifier circuit 200 and/or rectifier assembly 300. In the example application, synchronous rectifier circuit 200 is used in an AC distribution system 700 for powering blade servers via AC distribution. AC distribution systems allow for power to be delivered to the point-of-load (POL) converters using relatively high AC voltages without requiring additional conversion compared to DC distribution systems. The high AC voltages then are converted using synchronous rectifier (SR) circuits 200 to lower DC voltages that are optimized for a point-of-load regulator. The voltages can therefore be optimized for any part of the power path without requiring additional converters. Thus, the AC distribution system 700 provides improved power efficiency over conventional DC distribution systems like 12V DC distribution systems or 48V DC distribution systems an intermediate bus.

In one embodiment, the AC distribution system 700 comprises a supply 702, AC distribution block 704, and one or more server blades 706. AC supply 702 generates AC power 710 (e.g., a 50V AC supply). AC distribution block 704 distributes the AC power 710 to one or more server blades 706 as a distributed AC voltage 712 (e.g., a 50V AC voltage). Each server blade 706 comprises one or more synchronous rectifier circuits 200. Synchronous rectifier circuit 200 rectifies the distributed AC voltage 712 and provides DC power 714 directly to one or more point-of-load (POL) converters 708. Each POL converter 708 provides a regulated supply voltage for a high power component of the server blades 706 (e.g., a processor, memory, or graphics processor). For example, in one embodiment, the synchronous rectifier circuit 200 receives a 50V AC input voltage 712, and provides 5V unregulated DC power 714 to the POL converters 708. In various embodiments, different numbers of POL converters 708 can share a synchronous rectifier circuit 200 and different numbers of synchronous rectifier circuits 200 can be included in each blade server 706. Furthermore, as indicated by the dashed lines in FIG. 7, in various embodiments, different numbers of supplies 702 can optionally share the same AC distribution block 704 or shared AC distribution bus. Also, different numbers of synchronous rectifier circuits 200 can optionally share the same 5V DC bus.

Upon reading this disclosure, those of skill in the art will appreciate still additional alternative designs for a synchronous rectifier circuit and structural assembly. Thus, while particular embodiments and applications of the present invention have been illustrated and described, it is to be understood that the invention is not limited to the precise construction and components disclosed herein and that various modifications, changes and variations that will be apparent to those skilled in the art may be made in the arrangement, operation and details of the method and apparatus of the present invention disclosed herein without departing from the spirit and scope of the invention as defined in the appended claims.

What is claimed is:
1. A rectifier circuit comprising:
  a transformer configured to receive an input voltage across a primary winding and induce voltages across a first secondary winding and a second secondary winding;
  a first switch coupled in series between a first portion of the first secondary winding and a second portion of the first secondary winding, the first switch controlled by a first control signal;
  a second switch coupled in series between a first portion of the second secondary winding and a second portion of the second secondary winding, the second switch controlled by a second control signal;
  a first output terminal coupled to:
    a side of the first portion of the first secondary winding opposite the first switch; and
    a side of the first portion of the second secondary winding opposite the second switch; and
  a second output terminal having an output polarity opposite the first output terminal, the second output terminal coupled to:
    a side of the second portion of the first secondary winding opposite the first switch; and a side of the second portion of the second secondary winding opposite the second switch.

2. The rectifier circuit of claim 1, further comprising:
a first driver operably coupled to the first control signal and configured to control the first switch, wherein the first driver turns the first switch on when the input voltage has a positive polarity and turns the first switch off when the input voltage has a negative polarity, and wherein a positive current flows through the first switch to the second output terminal when the first switch is on; and
a second driver operably coupled to the second control signal and configured to control the second switch, wherein the second driver turns the second switch on when the input voltage has a negative polarity and turns the second switch off when the input voltage has a positive polarity, and wherein a positive current flows through the second switch to the second output terminal when the second switch is on.

3. The rectifier circuit of claim 2, further comprising:
a first voltage compensation winding coupled in series between the first driver and a control terminal of the first switch; and
a second voltage compensation winding coupled in series between the second driver and a control terminal of the second switch.

4. The rectifier circuit of claim 3, wherein the first voltage compensation winding has a substantially same electromagnetic path length as the first portion of the first secondary winding, and wherein the second voltage compensation winding has a substantially same electromagnetic path length as the first portion of the second secondary winding.

5. The rectifier circuit of claim 1, wherein the first and second portions of each of the secondary windings have a different number of turns or different electromagnetic path lengths.

6. The rectifier circuit of claim 1, wherein the first and second portions of each of the secondary windings have a substantially same number of turns or substantially same electromagnetic path lengths.

7. A method for rectifying an AC input voltage, the method comprising:
receiving an AC input voltage across a primary transformer winding;
inducing secondary voltages across a first secondary transformer winding and a second secondary transformer winding;
responsive to the AC input voltage having a positive polarity, turning on a first switch coupled in series between a first portion of the first secondary transformer winding and a second portion of the first secondary transformer winding, causing a positive current to flow from the first secondary transformer winding to a positive output terminal; and
responsive to the AC input voltage having a negative polarity, turning on a second switch coupled in series between a first portion of the second secondary transformer winding and a second portion of the second secondary transformer winding, causing a positive current to flow from the second secondary transformer winding to the positive output terminal.

8. The method of claim 7, wherein the first and second switches are MOSFETs (metal-oxide-semiconductor field-effect transistors), and wherein a source voltage of the first switch varies with the input voltage when the first switch is on, and wherein a source voltage of the second switch varies with the input voltage when the second switch is on, the method further comprising:
inducing a first gate voltage across a first voltage compensation winding, the first gate voltage varying with the input voltage such that a gate-source voltage of the first switch is substantially constant when the first switch is on; and
inducing a second gate voltage across a second voltage compensation winding, the second gate voltage varying with the input voltage such that a gate-source voltage of the second switch is substantially constant when the second switch is on.

9. The method of claim 8, wherein the first voltage compensation winding has a substantially same electromagnetic path length as the first portion of the first secondary winding, and wherein the second voltage compensation winding has a substantially same electromagnetic path length as the first portion of the second secondary winding.

10. The method of claim 7, wherein inducing a secondary side voltage across the secondary transformer winding comprises:
inducing different voltages across the first portion of the secondary winding and the second portion of the secondary winding.

11. The method of claim 7, wherein inducing a secondary side voltage across the secondary transformer winding comprises:
inducing a substantially same voltage across the first portion of the secondary winding and the second portion of the secondary winding.

12. An apparatus comprising:
a magnetic core;
at least one primary transformer winding wrapped around the magnetic core;
a pair of secondary transformer windings wrapped around the magnetic core, each of the pair of secondary transformer windings having at least a first portion and a second portion;
one or more electrical components coupled in series between the at least a first portion of the secondary transformer windings and the at least a second portion of the secondary transformer windings;
wherein the one or more electrical components comprise rectification components configured to rectify an AC voltage induced across the one or more secondary transformer windings and produce a rectified output voltage; and
wherein one side of the at least a first portion of each of the pair of secondary transformer windings are coupled together and one side of the at least a second portion of each of the pair of secondary transformer windings are coupled together.

13. The apparatus of claim 12, wherein the one or more secondary transformer windings comprises an even number of secondary transformer windings.

14. The apparatus of claim 12, wherein the one or more electrical components comprises a semiconductor-based electrical switch.

15. The apparatus of claim 12, wherein the magnetic core substantially encloses the one or more electrical components.

* * * * *